(12) United States Patent
Koito et al.

(10) Patent No.: US 7,880,850 B2
(45) Date of Patent: Feb. 1, 2011

(54) LIQUID CRYSTAL DISPLAY DEVICE COMPRISING AN ELECTRODE HAVING A CONNECTION PORTION WITH A DIELECTRIC MEMBER THEREON AS TO CONTACT A PIXEL ELECTRODE OF THE SECOND SUBSTRATE, AND MANUFACTURING METHOD FOR THE SAME

(75) Inventors: Takeo Koito, Kanagawa (JP); Shingo Kataoka, Tokyo (JP); Eiji Sakai, Kanagawa (JP); Hiroshi Nishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 11/952,313

(22) Filed: Dec. 7, 2007

(65) Prior Publication Data

US 2008/0151146 A1 Jun. 26, 2008

(30) Foreign Application Priority Data

Dec. 20, 2006 (JP) .............................. 2006-342140

(51) Int. Cl.
*G02F 1/1337* (2006.01)
*G02F 1/1339* (2006.01)
*G02F 1/1343* (2006.01)

(52) U.S. Cl. ........................ 349/144; 349/129; 349/130; 349/155

(58) Field of Classification Search .................. 349/129, 349/130, 144

See application file for complete search history.

(56) References Cited

U.S. PATENT DOCUMENTS

| 4,345,249 | A | 8/1982 | Togashi | |
|---|---|---|---|---|
| 6,897,918 | B1 * | 5/2005 | Nonaka et al. | 349/106 |
| 2002/0039161 | A1 * | 4/2002 | Kim | 349/129 |
| 2002/0050958 | A1 * | 5/2002 | Matthies et al. | 345/55 |
| 2004/0207788 | A1 * | 10/2004 | Yamaguchi et al. | 349/130 |
| 2005/0128396 | A1 * | 6/2005 | Tsuchiya et al. | 349/123 |
| 2005/0140916 | A1 * | 6/2005 | Kume et al. | 349/156 |
| 2005/0200784 | A1 * | 9/2005 | Kume et al. | 349/130 |

FOREIGN PATENT DOCUMENTS

| JP | 63-21907 | 10/1988 |
|---|---|---|
| JP | 10-186330 | 7/1998 |
| JP | 2003-315776 | 11/2003 |
| JP | 2005-128505 | 5/2005 |
| JP | 2005-189756 | 7/2005 |
| JP | 2005-227745 | 8/2005 |
| JP | 2005-257809 | 9/2005 |
| JP | 2005-266778 | 9/2005 |
| JP | 2006-058737 | 3/2006 |
| JP | 2007-011410 | 1/2007 |

OTHER PUBLICATIONS

An Office Action dated Sep. 16, 2008 from the Japanese Patent Office for Japanese Patent Application No. 2006-342140.

* cited by examiner

*Primary Examiner*—Mark A Robinson
*Assistant Examiner*—Dennis Y Kim
(74) *Attorney, Agent, or Firm*—SNR Denton US LLP (57) ABSTRACT

A liquid crystal display device is disclosed. The liquid crystal display includes a liquid crystal layer disposed between substrates opposing each other. A pixel of the liquid crystal display is alignment-divided into a plurality of sub-pixels. A dielectric member is provided on a connection portion where the sub-pixels are electrically connected.

10 Claims, 12 Drawing Sheets

FIG. 12 ical Application JP 2006-342140 filed in the

LIQUID CRYSTAL DISPLAY DEVICE COMPRISING AN ELECTRODE HAVING A CONNECTION PORTION WITH A DIELECTRIC MEMBER THEREON AS TO CONTACT A PIXEL ELECTRODE OF THE SECOND SUBSTRATE, AND MANUFACTURING METHOD FOR THE SAME

CROSS REFERENCES TO RELATED APPLICATIONS

The present invention contains subject matter related to Japanese Patent Application JP 2006-342140 filed in the Japanese Patent Office on Dec. 20, 2006, the entire contents of which being incorporated herein by reference.

BACKGROUND OF THE INVENTION

1. Field of the Invention

The present invention relates to a liquid crystal display device and a manufacturing method for the same.

2. Description of the Related Art

As is advantageously slim, light in weight, and low in power consumption, a liquid crystal display device has been popular as a display device being applicable to various many uses. The liquid crystal display device is recently used widely, including a large-sized television receiver for home use and a small-sized mobile phone, and thus the demand for the properties of the display device, especially the demand for the viewing angle thereof is getting tough.

In consideration thereof, proposed are previous TN (Twisted Nematic) mode and IPS (In-Plane Switching) mode (e.g., refer to Patent Document 1 (JP-B-63-21907)) and a multi-domain VA (Vertical Alignment) mode (MVA) (e.g., refer to Patent Document 2 (JP-A-10-186330), for example.

Among these modes, the VA mode typified by the MVA mode is of high in productivity with easy acquisition of high contrast and wide control margin of a cell gap, for example, because liquid crystal molecules are vertically aligned with respect to substrates. Patent Document 3 (JP-A-2005-266778) describes a method about the alignment control over liquid crystal molecules utilizing oblique electric fields attained by providing a dielectric member to a pixel portion as a means for alignment-division, or forming notches and slits to transparent electrode portions of the pixels, e.g., ITO (Indium Tin Oxide).

Figure 10A:
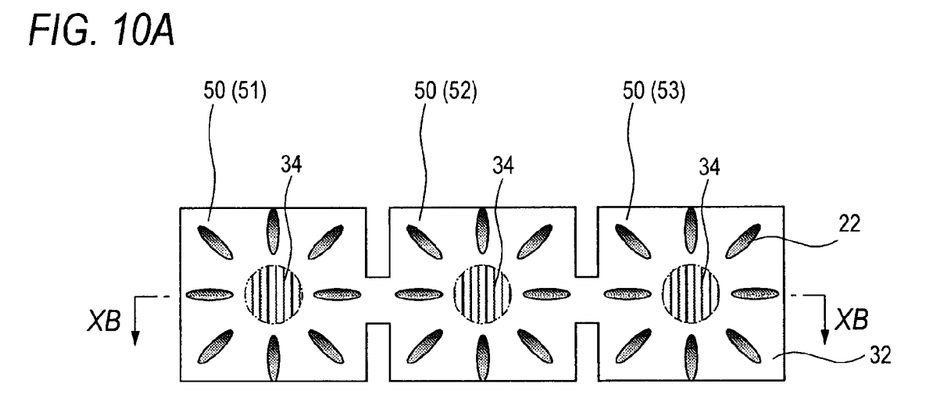
FIGS. 10A and 10B are respectively a schematic plan layout and a main-part cross sectional view of a previous liquid crystal display device.
Figure 10B:
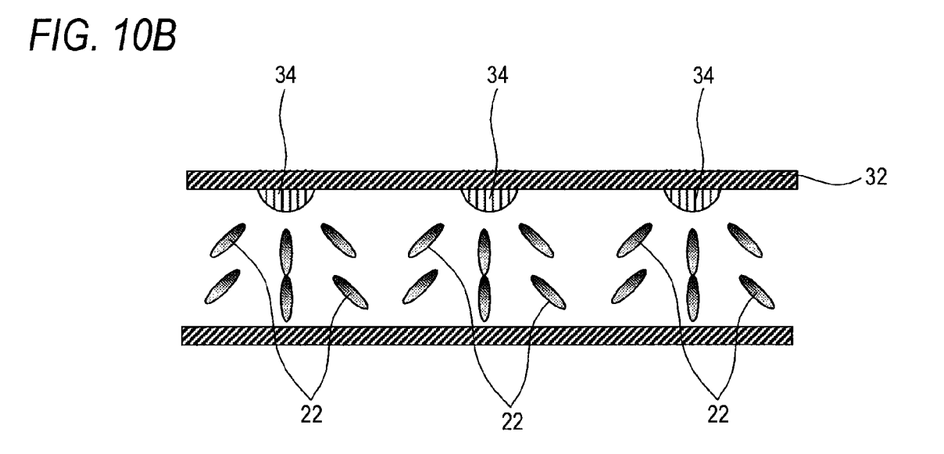

With such a method, as shown in the schematic plan layout of FIG. 10A and in its main-part cross sectional view of FIG. 10B, liquid crystal molecules 22 can be aligned radially around an alignment control element, e.g., dielectric member, 34 that is provided to a pixel electrode (common electrode) 32 in a sub-pixel 50. This is achieved by forming a notch to the pixel electrode 32 and a pixel electrode 12 in a pixel 40, thereby dividing the pixel 40 into a plurality of sub-pixels 50 (51, 52, and 53). To each of the resulting sub-pixels 50, the alignment control element 34 is disposed on the pixel electrode 32 located opposite to the pixel electrode 12 to be at the center of the sub-pixel 50. With the radial alignment of the liquid crystal molecules 22 as such, any perceivable change of intensity from the direction of the azimuth angle is reduced, thereby deriving properties of wide viewing angle.

Figure 11A:
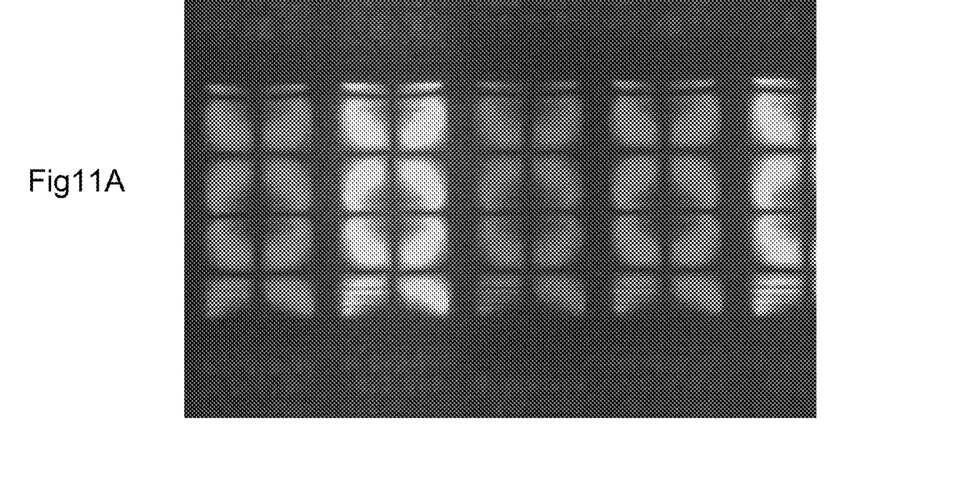
FIGS. 11A and 11B are respectively a photo of a pixel before and after a surface push to a liquid crystal display panel.
Figure 11B:
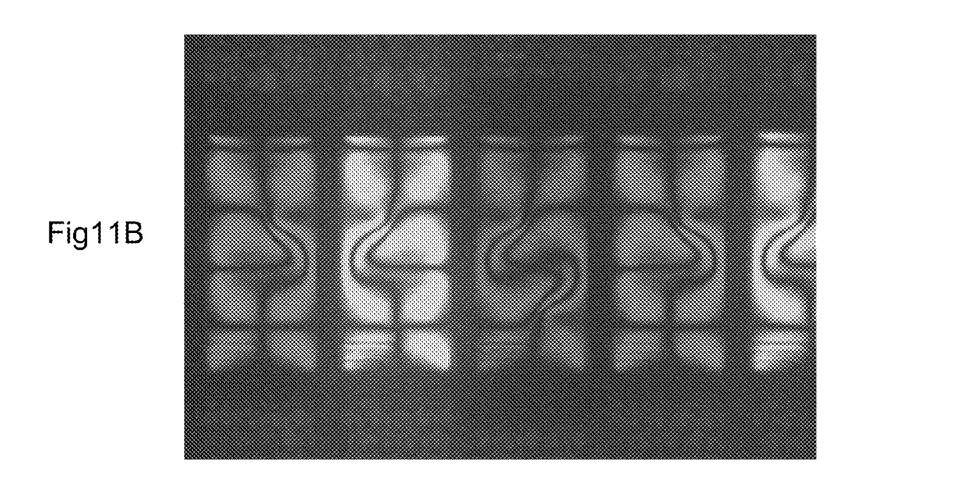

For dividing a pixel into a plurality of sub-pixels, however, there needs to establish an electrical connection among the sub-pixels. The method described above is thus making an attempt to leave a pixel electrode (common electrode) at the center portion of each of the sub-pixels. In this method, in the sub-pixel, an alignment control element provided to an opposing electrode takes charge of controlling the alignment direction. The problem with such a method is that the alignment control applied to the portion of electrical connection is weak. Therefore, when a liquid crystal panel is pushed, for example, the alignment of liquid crystal molecules is once lost as shown in the photo example of FIG. 11B. In FIG. 11B example, the liquid crystal molecules in the portion of electrical connection are pushed in the direction different from that before the push. The alignment of the sub-pixels is thus also lost, thereby resulting in poor alignment. As shown in the photo example of FIG. 11A, when the surface of the liquid crystal panel is not pushed, no misalignment is observed.

That is, as shown in FIGS. 10A and 10B, in a pixel, an electrical connection is previously required to be established among pixel electrodes (portions of connection) between sub-pixels. However, in the method above, no element is provided for defining the alignment in the portion of connection, whereby the state of alignment is not stable. When the alignment of the liquid crystal molecules is once lost without much choice with a push on the surface of the panel, for example, the alignment is never recovered back to the former condition.

Figure 12:
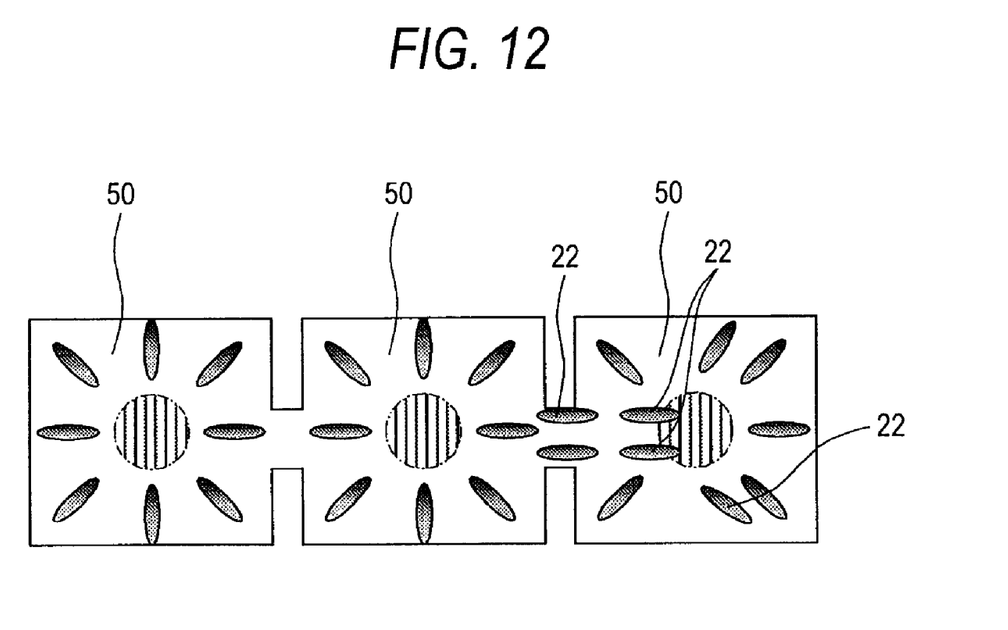
FIG. 12 is a schematic plan layout showing an exemplary misalignment.

FIG. 12 schematically shows an exemplary misalignment. The misalignment occurred to the liquid crystal molecules 22 is not recovered as such, observed on the panel is a phenomenon of abnormal display with a trace of misalignment. The degree of display abnormality can be reduced by disposing the sub-pixels 50 away from one another, but the longer distance among the sub-pixels 50 causes another problem of reducing the transmittance.

SUMMARY OF THE INVENTION

When the alignment of liquid crystal molecules is once lost with a push on a liquid crystal panel, for example, the alignment is never recovered back to the former condition, thereby resulting in abnormal display with a trace of misalignment on the liquid crystal panel.

It is thus desirable to suppress the degree of misalignment to be occurred to liquid crystal molecules as a result of a push on the display surface of a liquid crystal display device, i.e., surface push, by making sub-pixels as a result of pixel division to make those to serve each as an electrically independent pixel.

According to an embodiment of the invention, there is provided a liquid crystal display device including: a liquid crystal layer disposed between substrates opposing each other, wherein a pixel is alignment-divided into a plurality of sub-pixels, and a dielectric member is provided on a connection portion where the sub-pixels are electrically connected.

In the embodiment of the invention, the provision of a dielectric member on a portion of electrical connection among sub-pixels enables to electrically separate the sub-pixels from one another so that liquid crystal molecules can be aligned stably. As such, even if the alignment of the liquid crystal molecules is once lost due to a push on a liquid crystal panel, the alignment is soon recovered back to the former state thereof, thereby favorably solving the problem of poor display with a trace as a result of the surface push on the liquid crystal panel.

According to another embodiment of the invention, there is provided a manufacturing method of a liquid crystal display device which includes a liquid crystal layer disposed between substrates opposing each other, and in which a pixel is alignment-divided into a plurality of sub-pixels. The manufacturing method includes the step of forming a dielectric member on a connection portion where the sub-pixels are electrically connected.

In the this embodiment of the invention, the provision of a step of forming a dielectric member on a portion of electrical connection among sub-pixels enables to electrically separate the sub-pixels from one another so that liquid crystal molecules can be aligned stably. As such, even if the alignment of the liquid crystal molecules is once lost due to a push on a liquid crystal panel, the alignment is soon recovered back to the former state thereof, thereby favorably providing a liquid crystal display device causing no problem of poor display with a trace as a result of the surface push on the liquid crystal panel.

With the embodiments of the invention, there are advantages of being able to improve the display quality because there is no more possibility of poor display that has been caused by a surface push on a liquid crystal panel. Further, the size minimization is achieved to a dielectric member formed on a portion of electrical connection among sub-pixels and an alignment control element formed to each of the sub-pixels for alignment control over liquid crystal molecules, thereby being able to increase the transmittance. Still further, because the resistance against a surface push is improved, there is no more need to reduce the space between substrates, i.e., so-called cell gap, that has been required for improving the resistance against the surface push. This thus enables to increase the space between the substrates so that the properties of transmittance can be improved.

With the embodiments of the invention, there are advantages of being able to provide a liquid crystal display device with which the display quality is improved because there is no more possibility of poor display that has been caused by a surface push on a liquid crystal panel. Further, the size minimization is achieved to a dielectric member formed on a portion of electrical connection among sub-pixels and an alignment control element formed to each of the sub-pixels for alignment control over liquid crystal molecules, thereby being able to provide a liquid crystal display device with which the transmittance is increased. Still further, because the resistance against a surface push is improved, there is no more need to reduce the space between substrates, i.e., so-called cell gap, that has been required for improving the resistance against the surface push. This thus enables to provide the liquid crystal display device with which the space can be increased between the substrates so that the properties of transmittance can be improved.

DESCRIPTION OF THE PREFERRED EMBODIMENTS

Figure 1A:
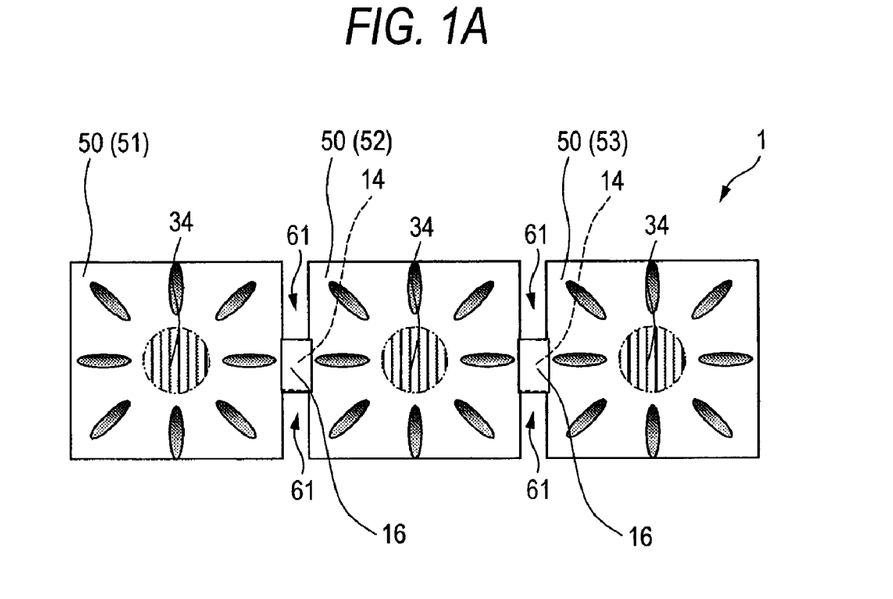
FIGS. 1A and 1B are respectively a schematic plan layout and a main-part cross sectional view of a first embodiment of the invention.
Figure 1B:
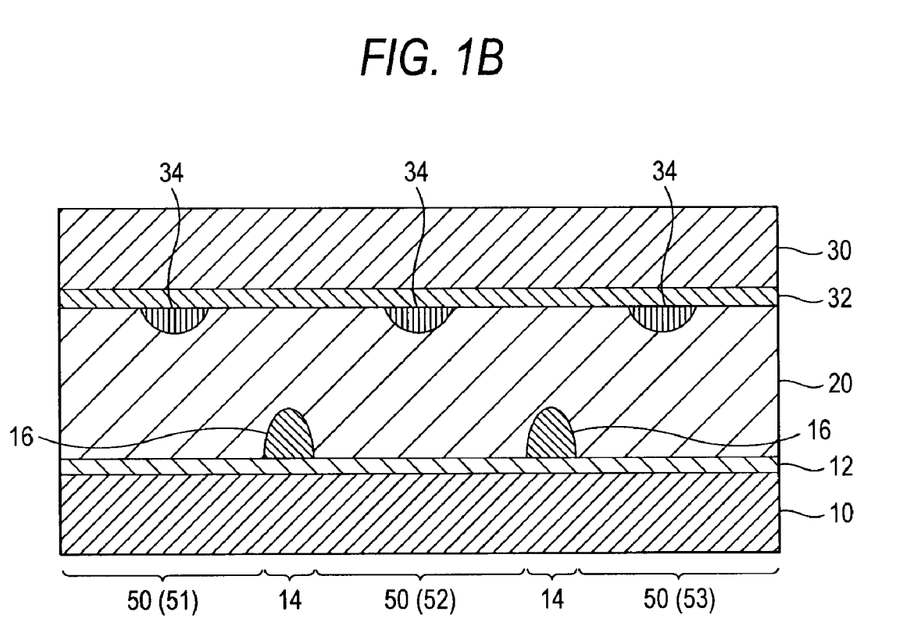

By referring to a schematic plan layout of FIG. 1A and a main-part cross sectional view of FIG. 1B, described is an embodiment, i.e., first embodiment, of the invention.

As shown in FIGS. 1A and 1B, the liquid crystal material of a liquid crystal display device 1 is of a vertical alignment type. In the device, a liquid crystal layer 20 is sealed between opposing substrates 10 and 30, and a plurality of pixels 40 are included for image display. The pixels 40 are each configured by a plurality of sub-pixels 50, e.g., sub-pixels 51, 52, and 53, which are alignment-divided. The sub-pixels 50 are electrically connected to one another by a pixel electrode 12 formed on the substrate 10, and the pixel electrode 12 between the sub-pixels 50 is formed with a notch 61, for example. The pixel electrode 12 between the sub-pixels 50 is formed thereon with a dielectric member 16, and such a portion is hereinafter referred to as connection portion 14.

The pixel division for alignment-dividing the pixels 40 is done by forming a hole, a slit, or the notch 60 as shown in FIGS. 1A and 1B to the pixel electrode 12 formed to the substrate 10. Alternatively, the pixel division may be done by a dielectric member formed on the pixel electrode 12 or a reflective electrode (not shown) connected thereto.

The substrate 30 opposing the substrate 10 on the side formed with the dielectric member 16, i.e., opposing substrate 30, is formed with a pixel electrode 32. At the portion of the pixel electrode 32 located at the center of each of the sub-pixels 50, i.e., the surface on the side of the liquid crystal layer 20, an alignment control element 34 is formed. This alignment control element 34 is formed by a dielectric member, for example.

In the above liquid crystal display device 1, the dielectric member 16 is formed on the connection portion 14 where the sub-pixels 50 are electrically connected to one another so that the sub-pixels 50 can be electrically separate from one another. As a result, the alignment of the liquid crystal layer 20, particularly, the alignment of liquid crystal molecules 22 at the connection portion 14 can be stabilized.

Figure 2A:
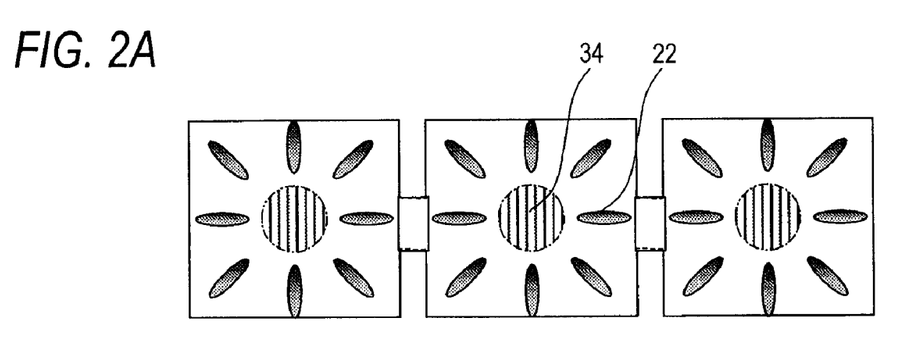
FIGS. 2A and 2B are respectively a schematic plan layout of a liquid crystal display panel before and after a surface push thereto.
Figure 2B:
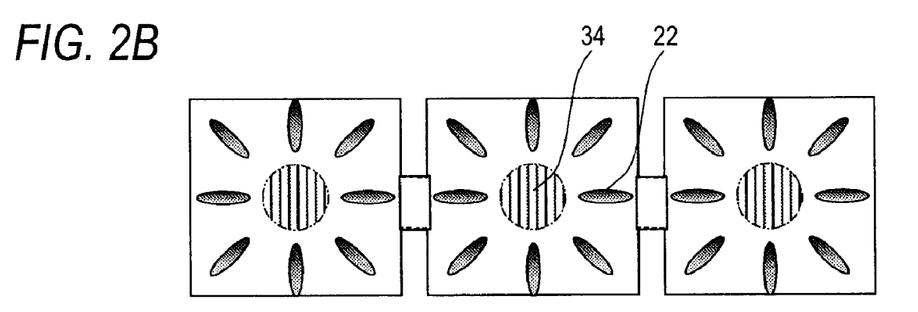

As shown in FIG. 2A, for example, before a surface push on a liquid crystal display panel, liquid crystal molecules 22 are aligned radially around the alignment control element 34. As shown in FIG. 2B, even after the surface push on the liquid crystal display panel, the liquid crystal molecules 22 are soon recovered back to the original alignment, i.e., radial alignment around the alignment control element 34, so that there is no possibility of causing misalignment of the liquid crystal molecules 22. As such, by being free from the possibility of misalignment of the liquid crystal molecules 22 even with a surface push, the problem of poor display with a trace of surface push on the liquid crystal panel can be successfully solved. What is better, any perceivable change of intensity from the direction of the azimuth angle is reduced, thereby deriving properties of wide viewing angle.

For the purpose of stabilizing the alignment of the liquid crystal molecules 22, the previous pixel configuration has required the connection portion 14 to have a specific length between the sub-pixels 50, and the alignment control element 34 on the opposing side to be of a specific size. Such requirements have been the causes of reduction of the transmittance. On the other hand, by disposing the dielectric member 16 to the connection portion 14 as in the embodiment of the invention, the size minimization can be achieved to the connection portion 14 and the alignment control element 34 because the alignment of the liquid crystal molecules 22 is stabilized as above. As such, the liquid crystal display device 1 can provide sufficient level of transmittance.

By referring to FIGS. 3A and 3B and Table 1, described next is the test result about the formation position of the dielectric member 16.

Figure 3A:
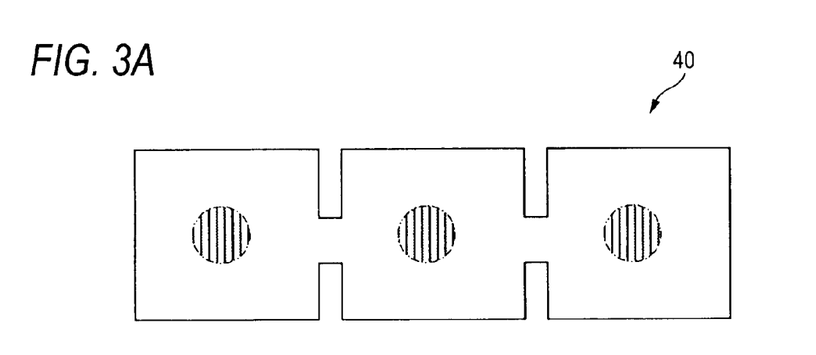
FIGS. 3A and 3B are respectively a schematic plan layout of an exemplary formation position of a dielectric member 16.
Figure 3B:
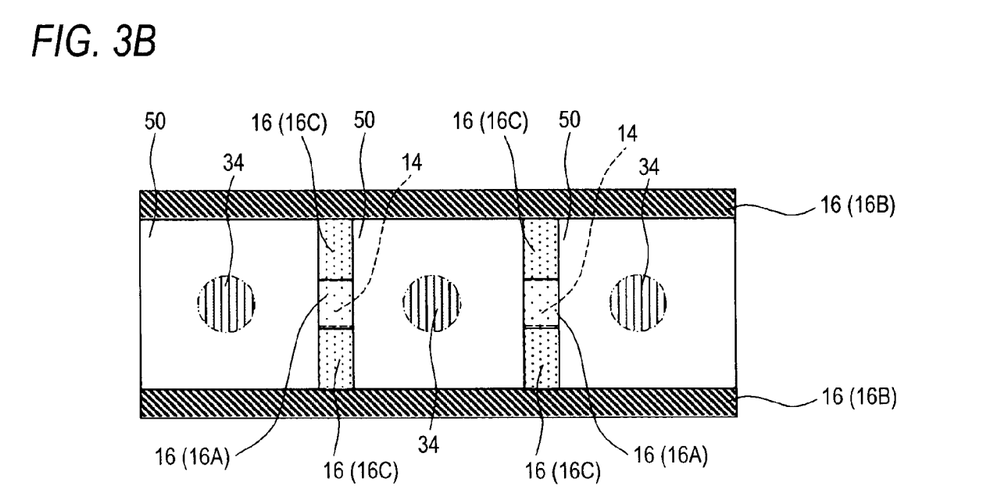

The test is carried out for the alignment stability of liquid crystal molecules against a surface push with the pervious configuration of the pixel 40 as shown in FIG. 3A, and with the configurations of FIG. 3B, i.e., the configuration in which the dielectric member 16 (16A) is disposed on the pixel electrode 12 between the sub-pixels 50, i.e., on the connection portion 14, the configuration in which the dielectric member 16 (16B) is disposed not on the connection portion 14 between the sub-pixels 50, the configuration in which the dielectric member 16 (16C) is disposed around the sub-pixels 50 but not on the connection portion 14 between the sub-pixels 50, and the configuration of a combination of such configurations. Table 1 shows the result of such a test. In Table 1, "A" indicates the test result with effect, and "B" indicates the text result with no effect.

member 16 not on the pixel electrode 12 being the connection portion 14, no effect is observed in terms of misalignment after a surface push. Such an effect in terms of misalignment is observed with the configuration in which the alignment control element 34 is a dielectric member or a slit formed to the pixel electrode 32. In consideration thereof, with the dielectric member 16 disposed on the pixel electrode 12 being the connection portion 14 between the sub-pixels 50, the sub-pixels 50 each become electrically separate. This accordingly leads to alignment stability so that the problem of poor image quality that is often caused by a surface push can be solved. Such an effect is similarly observed not only in liquid crystal display devices of transmissive and reflective types but also in liquid crystal display devices of semi-transmissive type including a pixel electrode formed both by a reflective electrode and a transparent electrode.

Figure 4A:
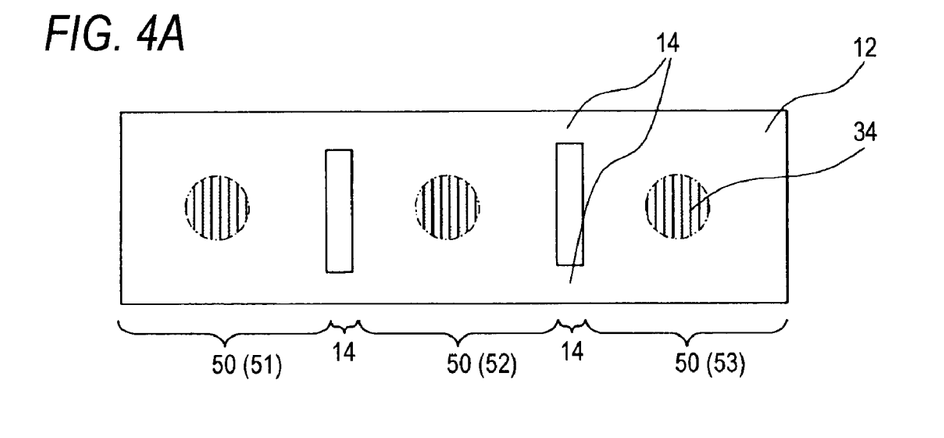
FIGS. 4A and 4B are respectively a schematic plan layout of a pixel electrode and an alignment control element showing the positional relationship therebetween, and a schematic plan layout of the pixel electrode and a dielectric member showing the positional relationship therebetween in a second embodiment of the invention.
Figure 4B:
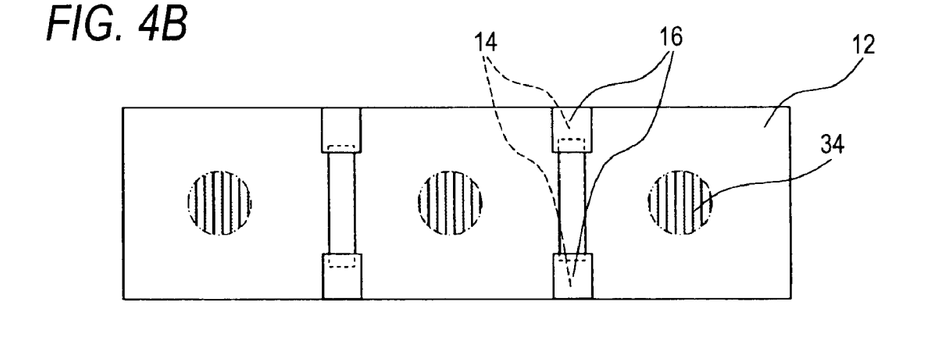

By referring to the schematic plan layout of FIG. 4A showing the positional relationship between a pixel electrode and an alignment control element, and another schematic plan layout of FIG. 4B showing the positional relationship between a pixel electrode and a dielectric member, described next is an embodiment, i.e., a second embodiment, of the invention.

As shown in FIG. 4A, the connection portion 14 of the pixel electrode 12 is formed to the vertical end portions between any two sub-pixels 50. As shown in FIG. 4B, by forming the dielectric member 16 to the connection portion 14, this configuration also leads to the effect similar to that of the configuration of the dielectric member 16A described by referring to Table 1.

Figure 5A:
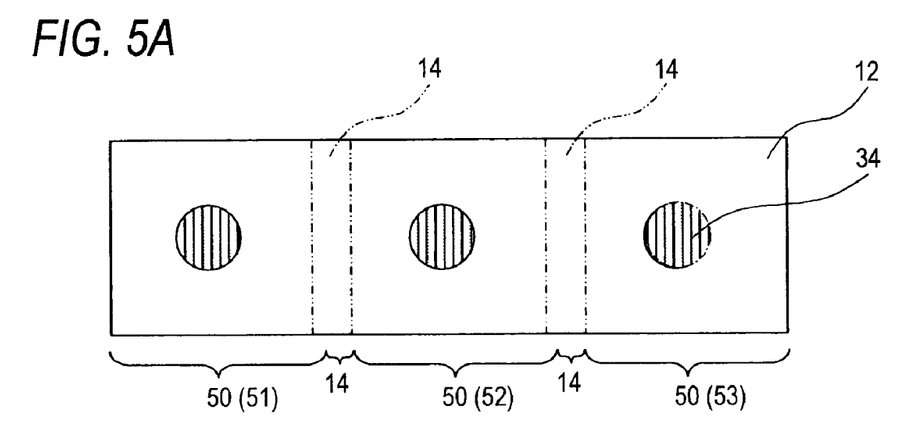
FIGS. 5A and 5B are respectively a schematic plan layout of a pixel electrode and an alignment control element showing the positional relationship therebetween, and a schematic plan layout of the pixel electrode and a dielectric member showing the positional relationship therebetween in a third embodiment of the invention.
Figure 5B:
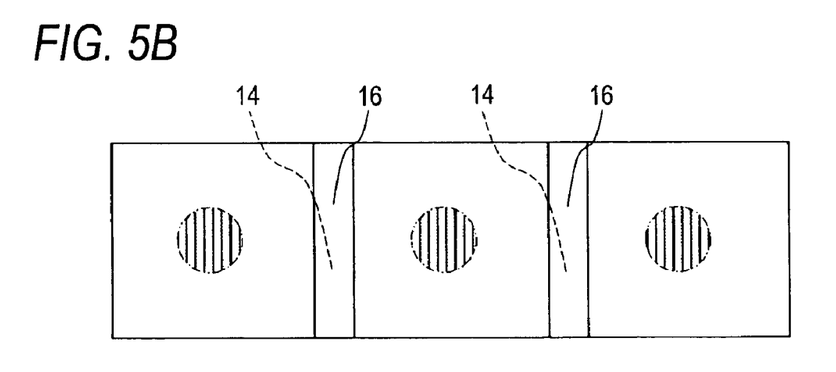

By referring to the schematic plan layout of FIG. 5A showing the positional relationship between a pixel electrode and an alignment control element, and another schematic plan layout of FIG. 5B showing the positional relationship between a pixel electrode and a dielectric member, described is an embodiment, i.e., a third embodiment, of the invention.

As shown in FIG. 5A, the connection portion 14 of the pixel electrode 12 is formed entirely to the portion between any two sub-pixels 50. As shown in FIG. 5B, by forming the dielectric member 16 on the connection portion 14, this configuration also leads to the effect similar to that of the configuration of the dielectric member 16A described by referring to Table 1.

TABLE 1

| | Placement of Dielectric Member | | | | | | | |
|---|---|---|---|---|---|---|---|---|
| Alignment Control Element on Opposing Side | No Dielectric Member | Dielectric Member 16A | Dielectric Member 16B | Dielectric Member 16C | Dielectric Member 16A + Dielectric Member 16B | Dielectric Member 16A + Dielectric Member 16C | Dielectric Member 16B + Dielectric Member 16C | Dielectric Member 16A + Dielectric Member 16B + Dielectric Member 16C |
| Dielectric Member | B | A | B | B | A | A | B | A |
| Hole of Pixel Electrode | B | A | B | B | A | A | B | A |
| Cross-Shaped Notch of Pixel Electrode | B | A | B | B | A | A | B | A |

A: With effect
B: No effect

As shown in Table 1, with the configuration including no dielectric member 16, a trace of misalignment is observed after a surface push. On the other hand, only with the configuration in which the dielectric member 16 is disposed on the pixel electrode 12 being the connection portion 14 between the sub-pixels 50, the alignment stability is observed. With the configuration including the dielectric As such, by forming the dielectric member 16 on the pixel electrode 12 (connection portion 14) where the sub-pixels are electrically connected irrespective of the formation position of the connection portion 14, the test result shows that the alignment of the liquid crystal molecules is stabilized, and no problem of misalignment is caused even with a surface push.

As shown in FIG. 3B, the alignment stability is improved when all of the dielectrics member 16A, 16B, and 16C are formed.

The liquid crystal display device generally shows the tendency of better alignment stability with a narrow space between opposing substrates, i.e., a narrow cell gap, but the tendency of decrease of transmittance. On the other hand, because the liquid crystal display device 1 of the embodiment of the invention has good and satisfactory alignment stability, as shown in Table 2, the margin widening effect of alignment stability can be expected also to the cell gap so that the transmittance can be also improved.

TABLE 2

| | Cell Gap | | | | |
|---|---|---|---|---|---|
| | 30 μm | 32 μm | 34 μm | 36 μm | 38 μm |
| Previous Pixel | A | B | B | B | B |
| Invention | A | A | A | A | A |

A: No trace of misalignment after surface push
B: With trace of misalignment after surface push The larger connection portion of the pixel electrode between sub-pixels being the results of pixel division generally stabilizes the alignment of liquid crystal molecules but is not enough to solve the problem of misalignment thereof and causes decrease of transmittance. On the other hand, because the liquid crystal display panel 1 of the embodiment of the invention has good and satisfactory alignment stability, as shown in Table 3, the connection portion can be smaller in size, thereby leading to the better transmittance.

TABLE 3

| | Connection Portion of Pixel Electrode | | |
|---|---|---|---|
| | 5 μm | 7 μm | 9 μm |
| Previous Pixel | B | B | B |
| Invention | A | A | A |

A: No trace of misalignment after surface push
B: With trace of misalignment after surface push The larger alignment control element formed to the opposing substrate generally stabilizes the alignment of liquid crystal molecules but is not enough to solve the problem of misalignment thereof as a result of a surface push and causes decrease of transmittance. On the other hand, because the liquid crystal display panel 1 of the embodiment of the invention has good and satisfactory alignment stability, as shown in Table 4, the alignment control element can be smaller in size, thereby leading to the better transmittance and perfectly eliminating the possible occurrence of misalignment. Table 4 shows an example in which a hole formed to the pixel electrode on the side of the opposing substrate is serving as an alignment control element. Alternatively, the alignment control element may be formed of a dielectric member, and with this being the case, the similar effect can be achieved.

TABLE 4

| | Opposing Alignment Control Element (Hole Formed to Electrode) | | |
|---|---|---|---|
| | 9 μmφ | 12 μmφ | 14 μmφ |
| Previous Pixel | B | B | B |
| Invention | A | A | A |

A: No trace of misalignment after surface push
B: With trace of misalignment after surface push The formation of the dielectric member 16 affects a contrast ratio. For improving the contrast ratio, shielding of light works effective. By referring to FIGS. 6A to 8, described are embodiments, i.e., fourth to sixth embodiments, in which a light-shielding film is formed.

Figure 6A:
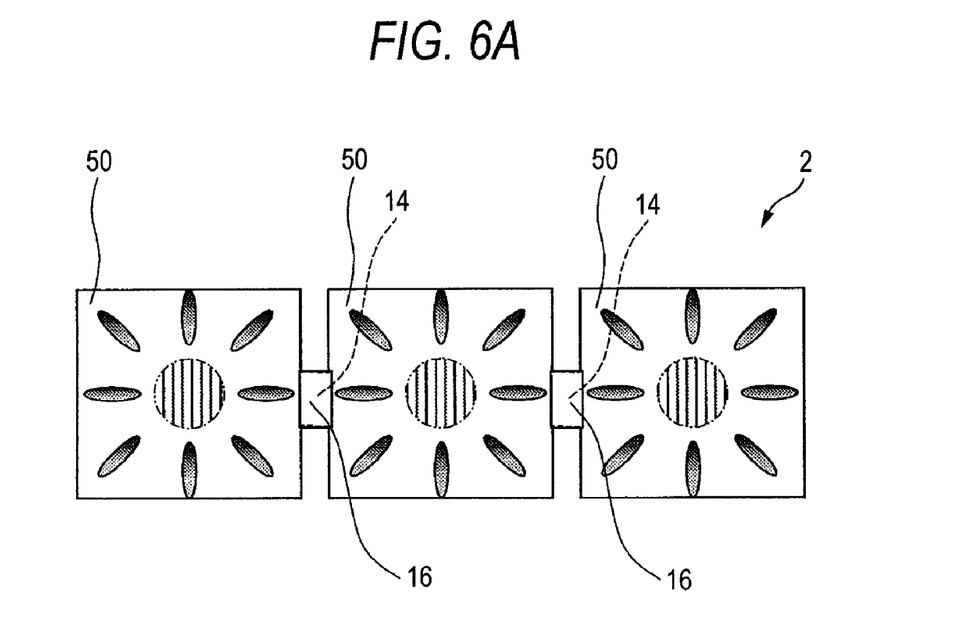
FIGS. 6A and 6B are respectively a schematic plan layout and a main-part cross sectional view of a fourth embodiment of the invention.
Figure 6B:
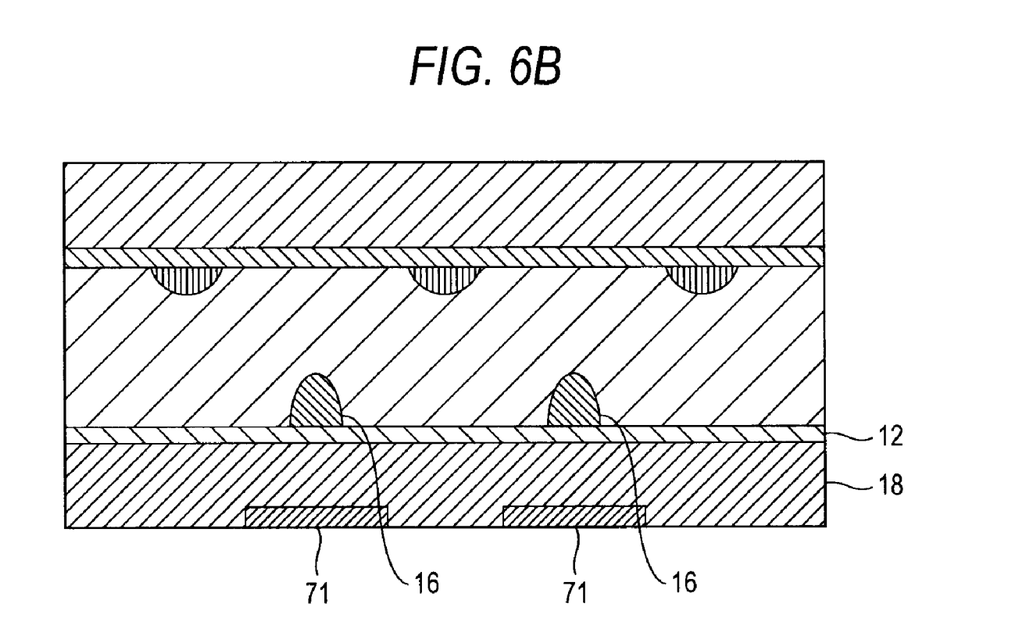

By referring to the schematic plan layout of FIG. 6A and the main-part cross sectional view of FIG. 6B, described first is the fourth embodiment.

As shown in FIGS. 6A and 6B, a liquid crystal display device 2 is similar in configuration to the liquid crystal display device 1 described by referring to FIGS. 1A and 1B but a difference lies in that a light shielding element 71 is formed below the dielectric member 16 on the side of the substrate (not shown) formed with the dielectric member 16. The dielectric member 16 is formed on the connection portion 14 via the pixel electrode 12 on a flat film 18. The flat film 18 is covering an element layer (not shown) formed on the substrate (not shown), and the connection portion 14 is a part of the pixel electrode 12 between the sub-pixels 50. Below the dielectric member 16 formed as such, the light-shielding element 71 is formed to the underside of the flat film 18.

With such a configuration as forming the light-shielding element 71 on the element side, the light-shielding element 71 can be formed at the same time in the process of forming the elements, i.e., at the time of metal processing of molybdenum (Mo), aluminum (Al), and others.

By referring to the schematic plan layout of FIG. 7A and the main-part cross sectional view of FIG. 7B, described next is the fifth embodiment.

Figure 7A:
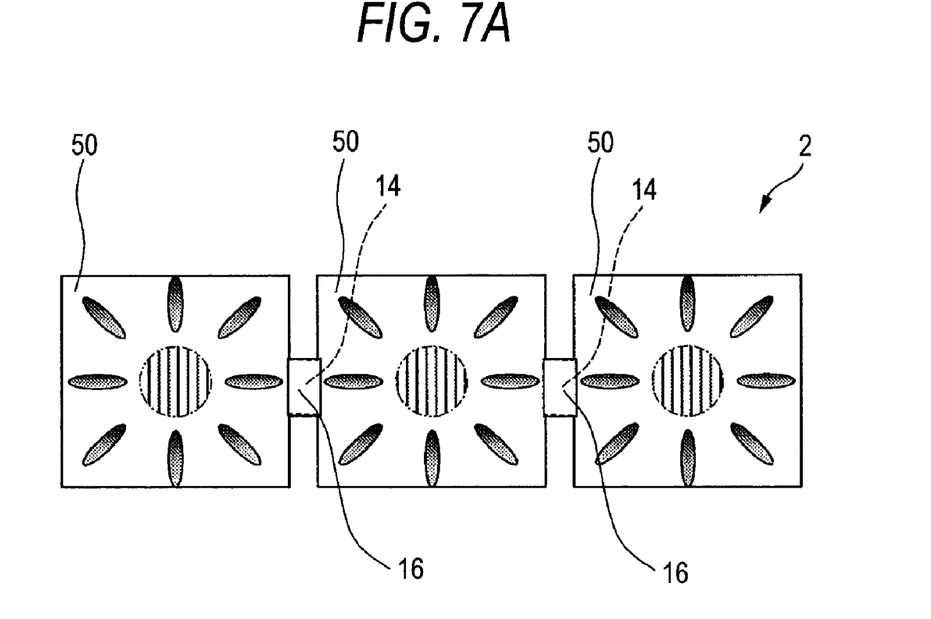
FIGS. 7A and 7B are respectively a schematic plan layout and a main-part cross sectional view of a fifth embodiment of the invention.
Figure 7B:
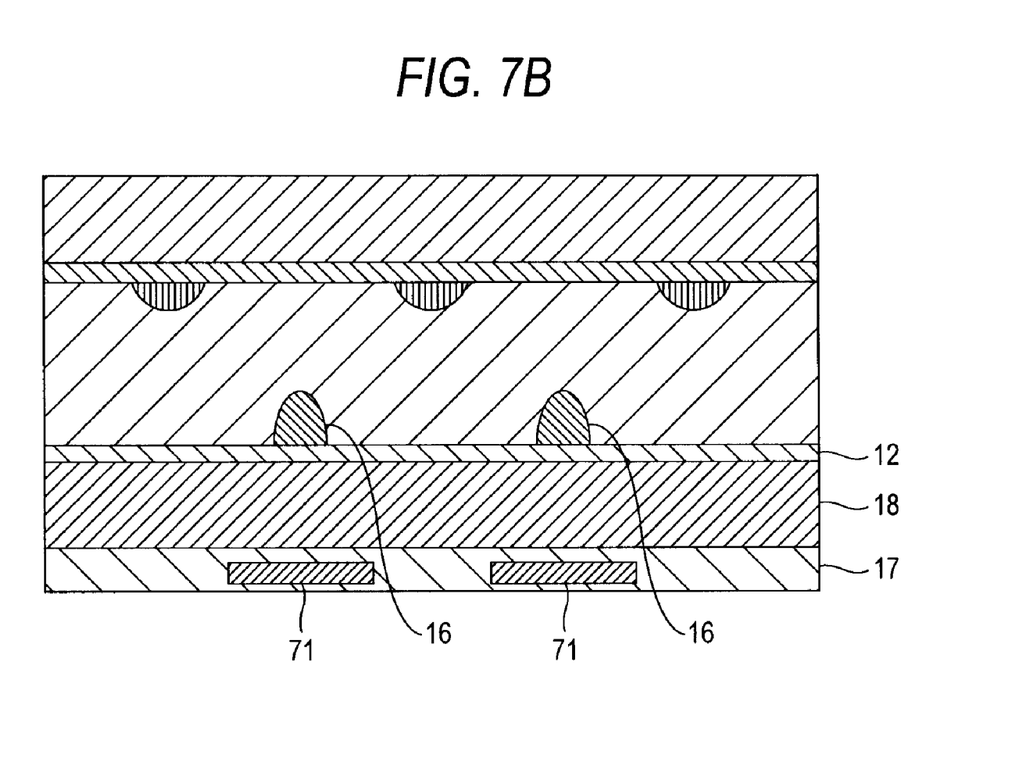

As shown in FIGS. 7A and 7B, the liquid crystal display device 2 is similar in configuration to the liquid crystal display device 1 described by referring to FIGS. 1A and 1B but a difference lies in that a light-shielding element 73 is formed below the dielectric member 16 on the side of the substrate (not shown) formed therewith. An inter-layer insulation film 17 is formed to cover an element layer (not shown) formed on the substrate (not shown), and on the upper surface thereof, the flat film 18 is formed. The dielectric member 16 is formed on the connection portion 14 being a part of the pixel electrode 12 between the sub-pixels 50 via the pixel electrode 12 on the flat film 18, and below the dielectric member 16, the light-shielding element 73 is formed in the inter-layer insulation film 17.

With such a configuration as forming the light-shielding element 73 on the element side, the light-shielding element 73 can be formed at the same time in the process of forming the elements, i.e., at the time of metal processing of molybdenum (Mo), aluminum (Al), and others.

By referring to the main-part cross sectional view of FIG. 8, described next is the sixth embodiment.

Figure 8:
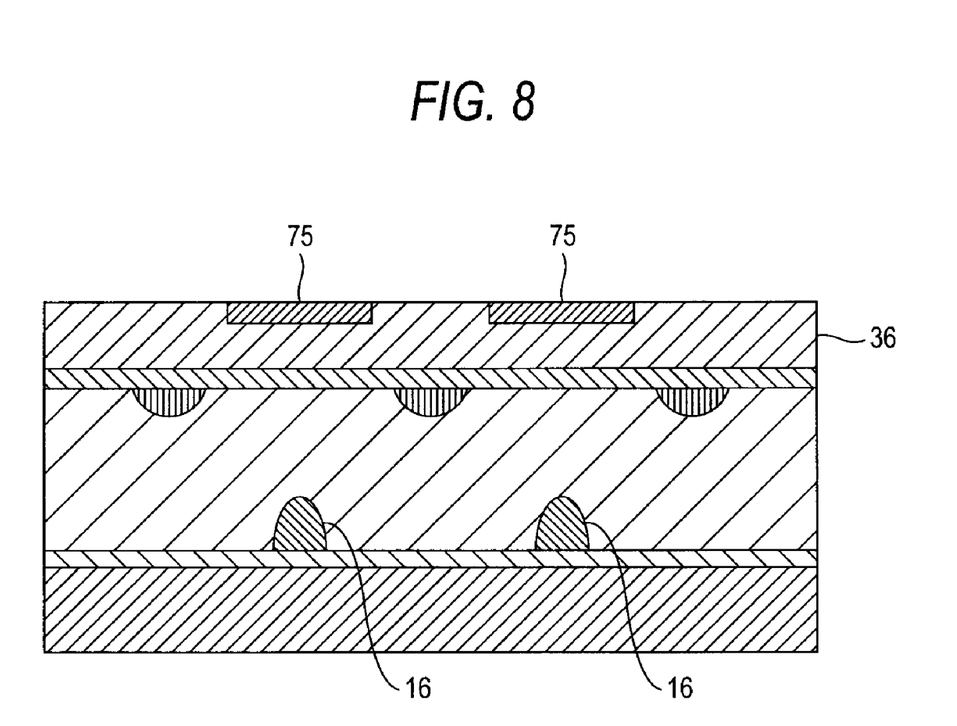
FIG. 8 is a main-part cross sectional view of a sixth embodiment of the invention.

As shown in FIG. 8, the liquid crystal display device 2 is similar in configuration to the liquid crystal display device 1 described by referring to FIGS. 1A and 1B but a difference lies in that a light-shielding element 75 is formed at a position opposing the dielectric member 16 on the side of the opposing substrate (not shown), which is opposing the substrate (not shown) formed with the dielectric member 16. For example, the light shielding element 75 is formed to the underside of a coloring layer, e.g., color filter, 36 formed on the opposing substrate (not shown).

With such a configuration as forming the light-shielding element 75 on the side of the color filter, the light-shielding element 75 can be formed at the same time with a black matrix so that no influence is exerted on the productivity.

As such fourth to sixth embodiments described above, forming the light-shielding elements 71, 73, and 75 enables to ensure the contrast ratio so that the display screen can have better viewability.

As shown in Table 5, as described by referring to FIG. 3B, forming not only the dielectric member 16A but also the dielectric members 16B and 16C can increase the control force over the alignment of the liquid crystal molecules. Moreover, to have the stability for the alignment, the dielectric members 16A, 16B, and 16C are required to be high to some degree. The result of Table 5 is with a liquid crystal display device with the cell gap of 3.5 µm, and the height considered effective for the dielectric members 16A, 16B, and 16C is dependent on any factors affecting the alignment of the liquid crystal molecules, e.g., cell gap, pixel size, pixel electrode, opposing alignment control element, and others.

TABLE 5

| Height of Dielectric Member | Placement Position of Dielectric Member A | | |
|---|---|---|---|
| | Dielectric Member A | Dielectric Member A + Dielectric Member B | Dielectric Member A + Dielectric Member B + Dielectric Member C |
| 0.7 µm | B | A | A |
| 1.2 µm | A | A | A |
| 1.7 µm | A | A | A |

As described above, the force of alignment control is increased as the height of the dielectric member 16 is increased, but as shown in Table 5, the contrast ratio is decreased as the height of the dielectric member 16 is increased. Note here that the dielectric member 16 of the higher height will decrease the optical properties but light shielding will solve the problem of the contrast ratio. Therefore, with height adjustment, the dielectric member 16 can be used also as a spacer for determining the cell gap. By referring to the main-part cross sectional view of FIG. 9, an example is described as a seventh embodiment.

TABLE 6

| | Height of Dielectric Member in Connection Portion between Sub-Pixels | | |
|---|---|---|---|
| | With Light Shielding | 0.7 µm | 1.7 µm |
| Contrast Ratio | 260 | 220 | 130 |

Figure 9:
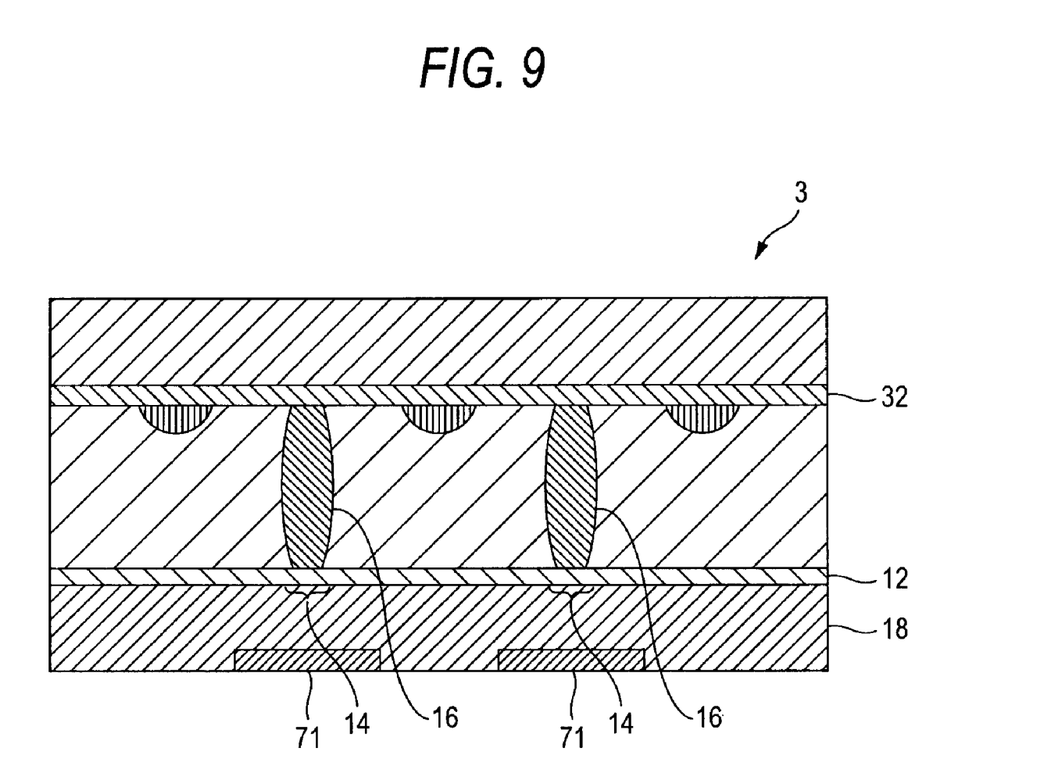
FIG. 9 is a main-part cross sectional view of a seventh embodiment of the invention.

As shown in FIG. 9, a liquid crystal display device 3 is similar in configuration to the liquid crystal display device 1 described by referring to FIGS. 1A and 1B but a difference lies in that a spacer is formed by the dielectric member 16 for determining a cell gap. As such, the dielectric member 16 is so formed as to be connected to the pixel electrode 12 on the element side and the pixel electrode 32 on the side of the opposing substrate (not shown). Also in this example, on the side of the substrate (not shown) formed with the dielectric member 16, the light shielding element 71 is formed below the dielectric member 16. This light shielding element can be configured as in the fifth and sixth embodiments described above. The dielectric member 16 is formed on the connection portion 14 being a part of the pixel electrode 12 between the sub-pixels 50 via the pixel electrode 12 formed on the flat film 18 provided for covering the element layer (not shown) formed on the substrate (not shown).

As in the seventh embodiment as such, when the dielectric member 16 is subjected to height adjustment for use as a spacer for forming a cell gap, there is no more need to provide a photo spacer on the side of the color filter so that the number of processes can be favorably reduced. What is more, because the dielectric member 16 formed to the electrical connection portion 14 between the sub-pixels serves also as the spacer for keeping the space between the substrates so that the spacer can be spaced at regular intervals. As a result, the space between the substrates can be kept uniform.

With the liquid crystal display devices described in the above embodiments, the dielectric member 16 is disposed on the connection portion 14 serving to electrically connecting the sub-pixels 50 so that the sub-pixels 50 can be electrically separate from one another. This favorably stabilize the alignment of the liquid crystal material (liquid crystal molecules) 22. As such, even if the alignment of the liquid crystal molecules is once lost as a result of a surface push on a liquid crystal display panel, the liquid crystal molecules are soon recovered back to the former state in terms of alignment, thereby solving the problem of poor display with a trace of surface push on the liquid crystal panel.

For forming the dielectric member 16 as such, in the manufacturing method of the normal liquid crystal display device, the pixel electrode 12 is processed so that the sub-pixels 50 are formed to the substrate 10 on the element side. Thereafter, executed is a process of forming the dielectric member 16 on the connection portion 14 being a part of the pixel electrode 12 that serves to at least electrically connect between the sub-pixels 50.

As such, by forming the dielectric member 16 on the connection portion 14 being a part of the pixel electrode 12 that serves to at least electrically connect between the sub-pixels 50, the problem of poor display with a trace of surface push on the liquid crystal panel can be solved. As such, there are advantages of being able to manufacture a liquid crystal display device with which the display quality can be increased. Further, it is possible to minimize the size of the dielectric member 16 on the connection portion 14 electrically connecting the sub-pixels 50 and the alignment control element 34 formed to each of the sub-pixels 50 to control the alignment of the liquid crystal molecules. As such, the resulting liquid crystal display device can have better transmittance. Still further, for the purpose of increasing the resistance against any surface push, the space between the substrates, i.e., so-called cell gap, has been required to be small. However, with the better resistance against any surface push as such, the space between the substrates can be large so that the resulting liquid crystal display device can have the better properties of transmittance.

Still further, the liquid crystal display devices 1 to 3 can be free from any error as a result of assembly accuracy of the color filter and the substrate on the element side, thereby being able to manufacture a liquid crystal display device with good accuracy.

Still further, the dielectric member 16 can be made of an organic or inorganic material. If with the dielectric member made of an organic material, for example, the organic material can include polymethyl methacrylate resin, novolac resin, and others.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising a liquid crystal layer disposed between first and second substrates, wherein,
   said display device comprises at least one pixel which is alignment-divided into a plurality of sub-pixels,
   said sub-pixels are connected together by an electrode on said first substrate,
   a connection portion is a portion of said electrode exposed by notches or slit between said sub-pixels,
   said connection portion has a width less than a width of said sub-pixels, and
   said connection portion has a dielectric member thereon, the dielectric member on the electrode of the first substrate being disposed so as to contact a pixel electrode of the second substrate.

2. The liquid crystal display device according to claim 1, wherein:
   a center of each of the sub-pixels includes an alignment control member on the pixel electrode of the second substrate.

3. The liquid crystal display device according to claim 1, further comprising a light shielding element on said first substrate on a side facing away from said second substrate.

4. The liquid crystal display device according to claim 1, further comprising a light shielding element on said second substrate on a side facing away from said first substrate.

5. The liquid crystal display device according to claim 1, wherein the dielectric member is disposed around the electrode on the first substrate.

6. The liquid crystal display device according to claim 1, wherein the dielectric member serves also as a spacer that maintains a space between the first and second substrates.

7. The liquid crystal display device according to claim 1, wherein the liquid crystal layer is of a vertical alignment type.

8. A method of manufacturing a liquid crystal display device which includes a liquid crystal layer disposed between first and second substrates, and in which a pixel is alignment-divided into a plurality of sub-pixels, the method including the steps of:
   forming an electrode on the first substrate on a side which will face said second substrate;
   forming notches or a slit between said sub-pixels electrically connected by a connection portion so that said connection portion has a width less than that of said sub-pixels; and
   forming a dielectric member on said connection portion, the dielectric member on the electrode of the first substrate being disposed so as to contact a pixel electrode of the second substrate.

9. The manufacturing method of the liquid crystal display device according to claim 8, wherein
   the dielectric member is formed to connect to the first and second substrates, and the dielectric member is made to serve also as a spacer to keep a space between the substrates.

10. The manufacturing method of the liquid crystal display device according to claim 8, wherein
    the dielectric member is formed around the electrode or on a part thereof.

* * * * *